United States Patent
Väänänen

(10) Patent No.: US 7,826,354 B2
(45) Date of Patent: Nov. 2, 2010

(54) METHOD PRESERVING DELAY PROPERTIES AND AN APPARATUS FOR SCHEDULING TRANSMISSION LINK CAPACITY BETWEEN PACKET SWITCHED TELECOMMUNICATIONS FLOWS

(75) Inventor: Janne Väänänen, Espoo (FI)

(73) Assignee: Tellabs Oy, Espoo (FI)

( * ) Notice: Subject to any disclaimer, the term of this patent is extended or adjusted under 35 U.S.C. 154(b) by 793 days.

(21) Appl. No.: 11/232,888

(22) Filed: Sep. 23, 2005

(65) Prior Publication Data
US 2006/0072568 A1 Apr. 6, 2006

(30) Foreign Application Priority Data
Sep. 24, 2004 (FI) .................................. 20041237

(51) Int. Cl.
*H04J 3/14* (2006.01)
(52) U.S. Cl. ........................................ 370/230; 370/235
(58) Field of Classification Search ............... 370/230, 370/401, 235, 432, 241, 395.21; 709/232, 709/102, 224; 710/52
See application file for complete search history.

(56) References Cited

U.S. PATENT DOCUMENTS

| | | | |
|---|---|---|---|
| 5,231,633 A | | 7/1993 | Hluchyj et al. |
| 5,872,777 A * | | 2/1999 | Brailean et al. ............. 370/349 |
| 6,490,640 B1 * | | 12/2002 | Johansson .................... 710/52 |
| 2001/0026535 A1 * | | 10/2001 | Amou et al. ................. 370/235 |
| 2002/0178282 A1 | | 11/2002 | Mysore et al. |
| 2003/0050954 A1 * | | 3/2003 | Tayyar et al. ............... 709/102 |
| 2003/0088690 A1 * | | 5/2003 | Zuckerman et al. ......... 709/232 |
| 2004/0081093 A1 * | | 4/2004 | Haddock et al. ............ 370/230 |

(Continued)

FOREIGN PATENT DOCUMENTS

EP 0 843 499 A2 5/1998

(Continued)

OTHER PUBLICATIONS

Hluchyj et al., Proceedings of the International Conference on Communications, New York, IEEE, US "Queueing disciplines for intergrated fast packet networks",vol. 4, pp. 990-996 (1992).

(Continued)

Primary Examiner—Steven H Nguyen
Assistant Examiner—Syed Bokhari
(74) Attorney, Agent, or Firm—Birch, Stewart, Kolasch and Birch, LLP

(57) ABSTRACT

The invention relates to a method and apparatus for scheduling transmission-link capacity between packet switched telecommunications flows (L1, L2), in such a way that it is possible to ensure the scheduling of packets representing delay-critical traffic to the transmission link (S) before packets representing non-delay-critical traffic and, in addition, to achieve the desired division of the capacity of the transmission link (S) between different traffic groups. The invention is based on performing the selection in the scheduling in stages, as follows: 1) the packets with the highest priority among the packets being offered are sought and 2) from the sub-group obtained, a final selection is performed using a weighting-factor based scheduling method, in such a way that the same weighting-factor based scheduling process is used to handle the sub-groups representing different priority levels in the consecutive selection situations.

8 Claims, 4 Drawing Sheets

U.S. PATENT DOCUMENTS

2004/0085964 A1     5/2004    Väänänen
2005/0105532 A1*   5/2005    Yun et al. ............... 370/395.21
2005/0243853 A1*   11/2005   Bitar et al. .................. 370/432
2008/0034086 A1*   2/2008    Castelli et al. .............. 709/224

FOREIGN PATENT DOCUMENTS

WO     WO-2004/004248 A1    1/2004

OTHER PUBLICATIONS

Wang et al., International Conference on Hong Kong, China, Real-Time Computing Systems and Applications, pp. 312-319, (1999).

Gowal et al., "Start-time Fair Queuing: A Scheduling Algorithm for Integrated Services Packet Switching Networks", Technical Report TR -96-02, Department of Computer Sciences, University of Texas Austin, pp. 1-27.

Wischhof et al., "Packet Scheduling for Link-Sharing and Quality of Service Support in Wireless Local Area Networks.", Department of Computer Science, Applied Research Lab, Washington University, Saint Louis, Nov. 13, 2001, pp. 1-208.

"Understanding and Configuring MDRR/WRED on the Cisco 12000 Series Internet Router", Presentation of MDRR (Modified Deficit Round Robin) / Cisco Systems / Location: http://www.cisco.com/warp/public/63/mdrr_wred_overview.html.

* cited by examiner

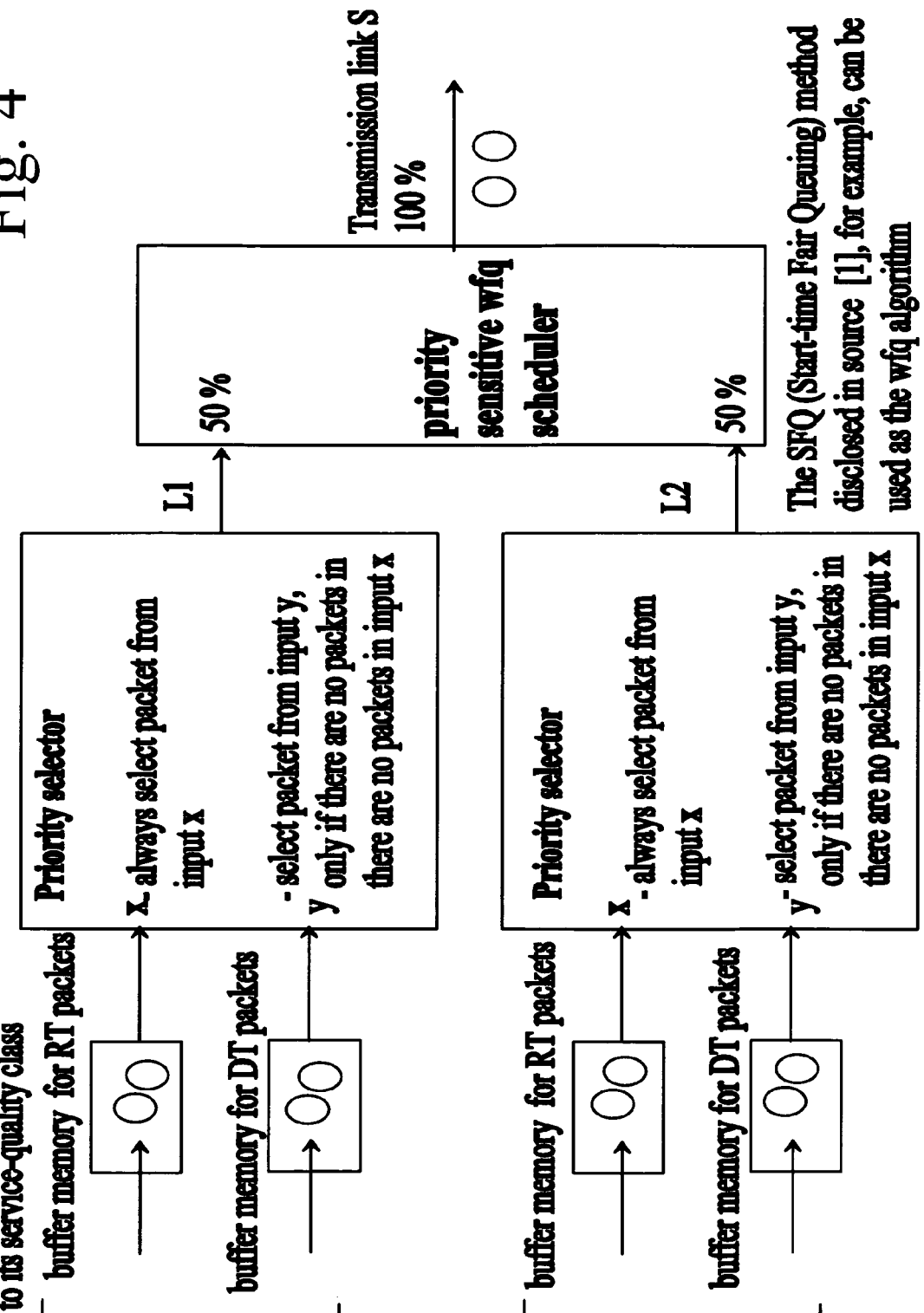

METHOD PRESERVING DELAY PROPERTIES AND AN APPARATUS FOR SCHEDULING TRANSMISSION LINK CAPACITY BETWEEN PACKET SWITCHED TELECOMMUNICATIONS FLOWS

FIELD OF THE INVENTION

The present invention relates to a method for scheduling transmission link capacity between packet switched telecommunications flows.

The invention also relates to an apparatus for scheduling transmission link capacity between packet switched telecommunications flows.

BACKGROUND

In this document, the following abbreviations are used in the descriptions of both the prior art and the invention:
CoS Class of Service,
DRR Deficit Round Robin, a scheduling method based on a weighting factor [2],
DT Data Transfer, a service-quality class for applications, for which upper-limit values are not guaranteed for data-transmission delay and variation in delay,
DSCP Differentiated Services Code Point, information carried by a packet, as to which service-quality class the packet in question belongs,
MDRR Modified Direct Round Robin, a scheduling method based on a weighting factor [3],
QoS Quality of Service,
RT Real Time, a service-quality class for applications, for which an attempt is made to minimize the data transmission delay and the variation in delay, but which do not benefit from momentarily free telecommunications network capacity,
SFQ Start-time Fair Queuing, a scheduling method based on a weighting factor [1],
wfq weighted fair queuing, a scheduling method based on a weighting factor, used as a general name,
WFQ Weighted Fair Queuing, a scheduling method based on a weighting factor [1].

In a packet-switching telecommunications system, it is often advantageous for the telecommunications packets (Pkt, FIG. 1, hereinafter 'packet') to be classified as belonging to different service-quality classes (CoS), according to the requirements of the application using the telecommunications service, and, on the other hand, to the kind of agreement on the quality of service that has been made between the telecommunications service provider and its customers. For example, in the case of a normal telephone application, it is essential that the data-transmission speed required by the application is available for the time needed and that the transmission delay is sufficiently small and the variation in the transmission delay is sufficiently low. In a telephone application, there is no benefit in the data transmission speed provided for the application being able to be increased momentarily, if the loading of the telecommunications network is low at the time in question. On the other hand, for example, when downloading a www page, it is extremely advantageous to be able to exploit to the full the free capacity of the network even momentarily.

By way of example, let us examine a situation, in which a telecommunications service offers the following kind of service-quality classes:
RT (Real Time): for applications, for which the data transmission delay and the variation in the transmission delay are attempted to be minimized, but the momentary data transmission speed provided for the application is not increased, even if the loading of the telecommunications system at the time in question is low,
DT (Data Transfer): for applications, for which upper-limit values are not guaranteed for the transmission delay and the variation in the delay, but for which the free capacity of the telecommunications system at each moment in time is exploited.

Let us examine, by way of example, the following situation in FIG. 1, in which the capacity of a telecommunications link S is divided between two customers A1 and A2, in such a way that both customers are given at least 50% of the capacity. If one of the customers uses less capacity than their own 50% quota during a specific period of time, the free capacity during the period in question is available to the other customer. Both customers can produce both RT and DT traffic. Because the RT traffic is delay-critical, the RT traffic is assumed to be limited so that the customer can produce RT traffic to a maximum of 50% of the telecommunications link S. If the limitation in question were not imposed, the buffer memories of the network element NE1 could become filled uncontrollably, in which case the transmission delays would also grow uncontrollably. In order to limit the delays in the RT traffic, the packets representing the RT traffic are scheduled to the transmission link S with a higher priority than that of packets representing DT traffic.

FIG. 2 shows one way according to the prior art for scheduling the capacity of a common transmission link in a situation like that described above. The operation of the system shown in FIG. 2 is as follows:
the service-quality class to which an individual packet belongs can be identified on the basis of information attached to the packet (for example, DSCP=Differentiated Services Code Point[2]),
the packets are directed to service-quality class and customer-specific buffer memories (customer-specific RT and DT buffers),
in the internal processing of the customer's traffic, the packets representing RT traffic are scheduled with a higher priority than that of the packets representing DT traffic,
each customer's RT-class traffic is assumed to be limited ($\leq$50% of the capacity of the transmission link) before the scheduler apparatus.

A problem in the method shown in FIG. 2 is that a traditional scheduling method based on a weighting factor (wfq) processes the traffic components (L1 and L2) offered to the scheduler in such a way that both receive the share of the transmission link S capacity (in this case, 50% for each). If, for example, an RT packet is offered from customer A1 and a DT packet is offered from customer A2, there is no way to guarantee that the RT packet will be scheduled to the transmission link before the DT packet. In general, the scheduling sequence is random. Because RT packets represent delay-critical traffic, they should, however, always be scheduled to the transmission link S before the DT packets.

FIG. 3 shows another way according to the prior art to schedule the capacity of a common transmission link S in a situation like that described above. In the situation shown in FIG. 3, the scheduling operation is as follows:
the customers' A1 and A2 shares of the traffic RT (RTA1 and RTA2) are scheduled using a weighting-factor based scheduling method (wfq). The DT shares (DTA1 and DTA2) are scheduled in a similar manner. The wfq schedulings of the RT and DT shares are handled independently of each other.

the final selection of the packet to be sent to the transmission link is made between the RT and DT traffic, using a priority-selection method.

A problem in the scheduling method shown in FIG. 3 is that customer A1 or A2 will not receive their promised 50% share of the capacity of the transmission link S in all circumstances. For example, let us examine a situation, in which customer A1 produces 50% of the RT-traffic capacity of the transmission link S and also DT traffic to 50% of the capacity of the transmission link S. Customer. A2 produces only DT traffic at a speed of 50% of the capacity of the transmission link S. In this situation, the desired, operation would be for the RT traffic produced by customer A1 to proceed and the DT traffic to be dropped, while the DT traffic produced by customer A2 would be allowed to proceed. Thus customer A1 would use its own 50% quota for RT traffic, the transmission of which being regarded as more important than the transmission of the DT traffic, while customer A2 would use its own 50% quota for DT traffic. How to divide their own capacity shares between RT and DT traffic would remain the customers' own internal matter. However, in the system according to FIG. 3, the capacity of the transmission link S is divided as follows: 50% goes to the RT traffic of customer A1 while the remainder is divided equally between the DT-traffic shares of customers A1 and A2. This means that customer A1 gets 75% and customer A2 25% of the capacity of the transmission link S. The situation is not satisfactory, because customer A2 does not get the 50% share of the capacity of the transmission link S that it has been promised.

SUMMARY

The invention is intended to eliminate the defects of the prior art disclosed above and for this purpose create an entirely new type of method and apparatus for scheduling transmission connection capacity between packet-switched telecommunications flows. The invention relates to a method, by means of which a scheduler apparatus can be implemented, in such a way that it is possible to ensure that packets representing delay-critical traffic are scheduled to the transmission link before packets representing non-delay-critical traffic and, in addition, achieve the desired division of the capacity of the transmission link S between different traffic groups (in the example situation described above, the traffic produced by customers A1 and A2).

The invention is based on performing the selection in weighting-factor based scheduling (wfq) in stages, as follows: in Stage 1) the packets with the highest priority are sought from the group J of the packets being offered. For example, if there are three priority levels 'high', 'medium', and 'low', and if as selection candidates there are N packets with a 'medium' priority and M packets with a 'low' priority, then the result of the first stage of the selection is a sub-group J\Highest formed by the N 'medium'-priority packets. In Stage 2) a final selection is made from the sub-group J\Highest in question using a weighting-factor based scheduling method, for example WFQ or SFQ. The essential feature is that the same weighting-factor based scheduling method is used in the sequential selection situations processing the sub-groups representing the different priority levels. This is the essential difference compared to the methods according to the prior art. For example, the system shown in FIG. 3 corresponds logically to the method according to the invention in all other respects, except that in the system according to FIG. 3 the sub-groups representing different priority levels are handled independently of each other, using weighting-factor based scheduling processes.

In the system according to the invention, the priority-based selection processes and the weighting-factor based scheduling process can be implemented either using a programmable processor, or using a microcircuit apparatus designed for the operations in question (Application Specific Integrated Circuit 'ASIC' implementation).

In the method according to the invention:
digital information is transmitted as constant or variable-size packets,
a priority value is attached to each packet,
a weighting-factor value is attached to each packet,
there are at least two priority-value alternatives, and
of the packets that are offered for forwarding, one is selected and is forwarded from the system using an outgoing data transmission link, and once the transmission has terminated the next packet is selected, wherein the selection of the packet to be forwarded is performed in two stages, as follows: 1), a sub-group, which contains the packets representing the highest priority value to be found from the group of the packets offered, is separated from the group of the packets offered for forwarding, and 2) a packet to be forwarded is selected, using a weighting-factor based scheduling method, from the sub-group obtained, in such a way that, in the consecutive selection situations, the sub-groups representing different priority values are handled using the same weighting-factor based scheduling process and same sequence indicators of the weighting-factor based scheduling process.

The apparatus according to the invention comprises:
means for receiving constant or variable-size packets containing digital information,
means for defining a priority value for a packet,
means for defining a weighting-factor value for a packet,
means for selecting one packet from the group of packets that are offered for forwarding,
means for forwarding the selected packet using an outgoing data transmission link, wherein the apparatus comprises means, with the aid of which: 1), a sub-group, which contains the packets representing the highest priority value to be found from the group of the packets offered, can be separated from the group of the packets offered for forwarding, and with the aid of which 2) a packet to be forwarded can be selected, using a weighting-factor based scheduling method, from the sub-group obtained, in such a way that, in the consecutive selection situations, the sub-groups representing different priority values are handled using the same weighting-factor based scheduling process and same sequence indicators of the weighting-factor based scheduling process.

Compared to solutions according to the prior art, the use of the invention achieves the advantage that it is possible to ensure the scheduling of packets representing delay-critical traffic before packets representing non-delay-critical traffic and, in addition to achieve the desired division of the transmission-link capacity between different traffic groups (for example, between traffic produced by specific customers).

BRIEF DESCRIPTION OF FIGURES

In the following, the invention is examined in greater detail with the aid of examples according to the accompanying figures.

FIG. 4 shows a block diagram of the system according to the invention, in an example of an operating environment, for scheduling the capacity of a transmission link S for traffic flows representing customers A1 and A2 as well as the aforementioned service-quality classes (RT and DT).

DETAILED DESCRIPTION OF EMBODIMENTS

Figure 1:
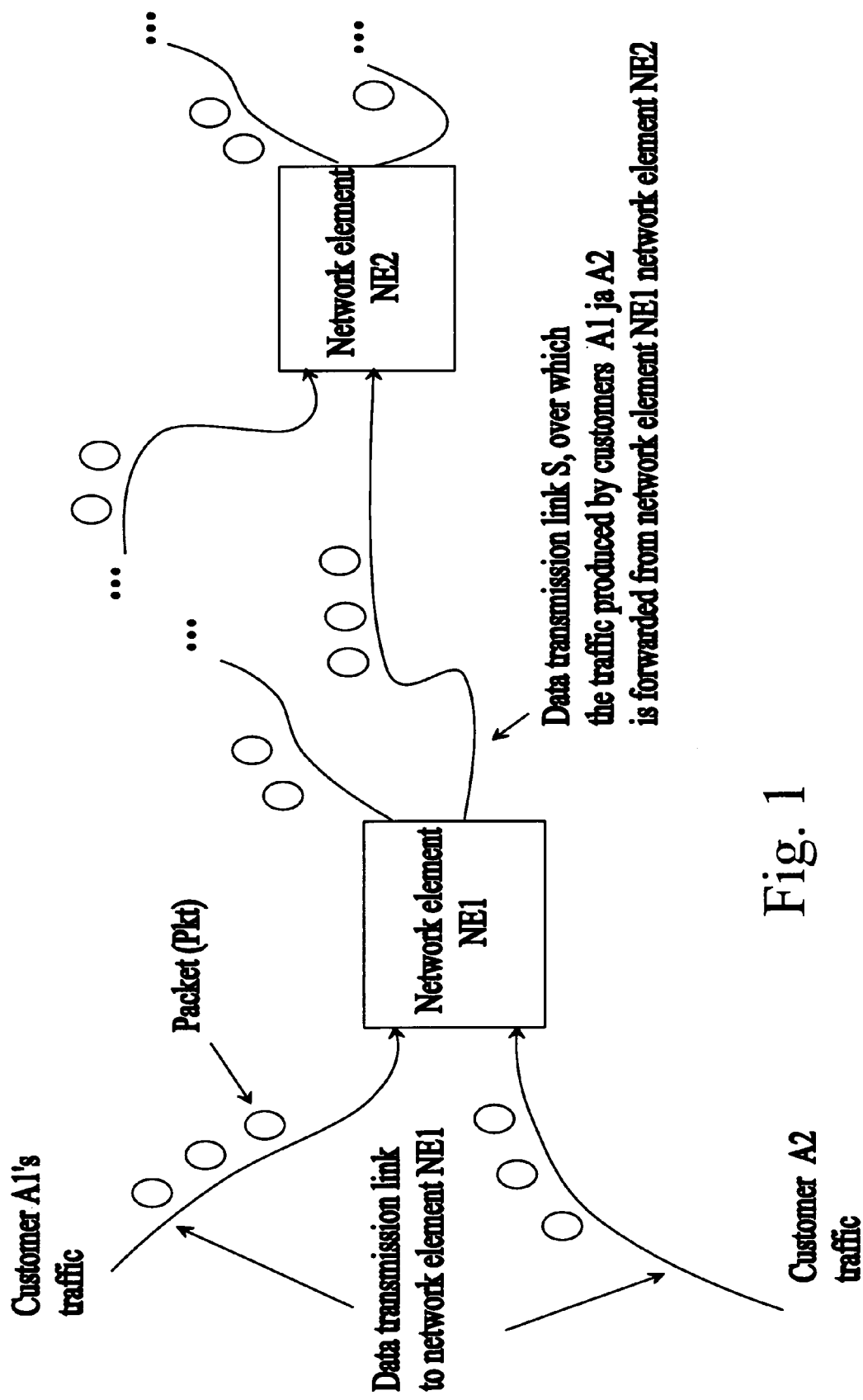
FIG. 1 shows, as an example for examination, an available packet-switching telecommunications system. The telecommunications packets arriving from customers A1 and A2 are scheduled to the forwarding data transmission link S in the network element NE1.
Figure 2:
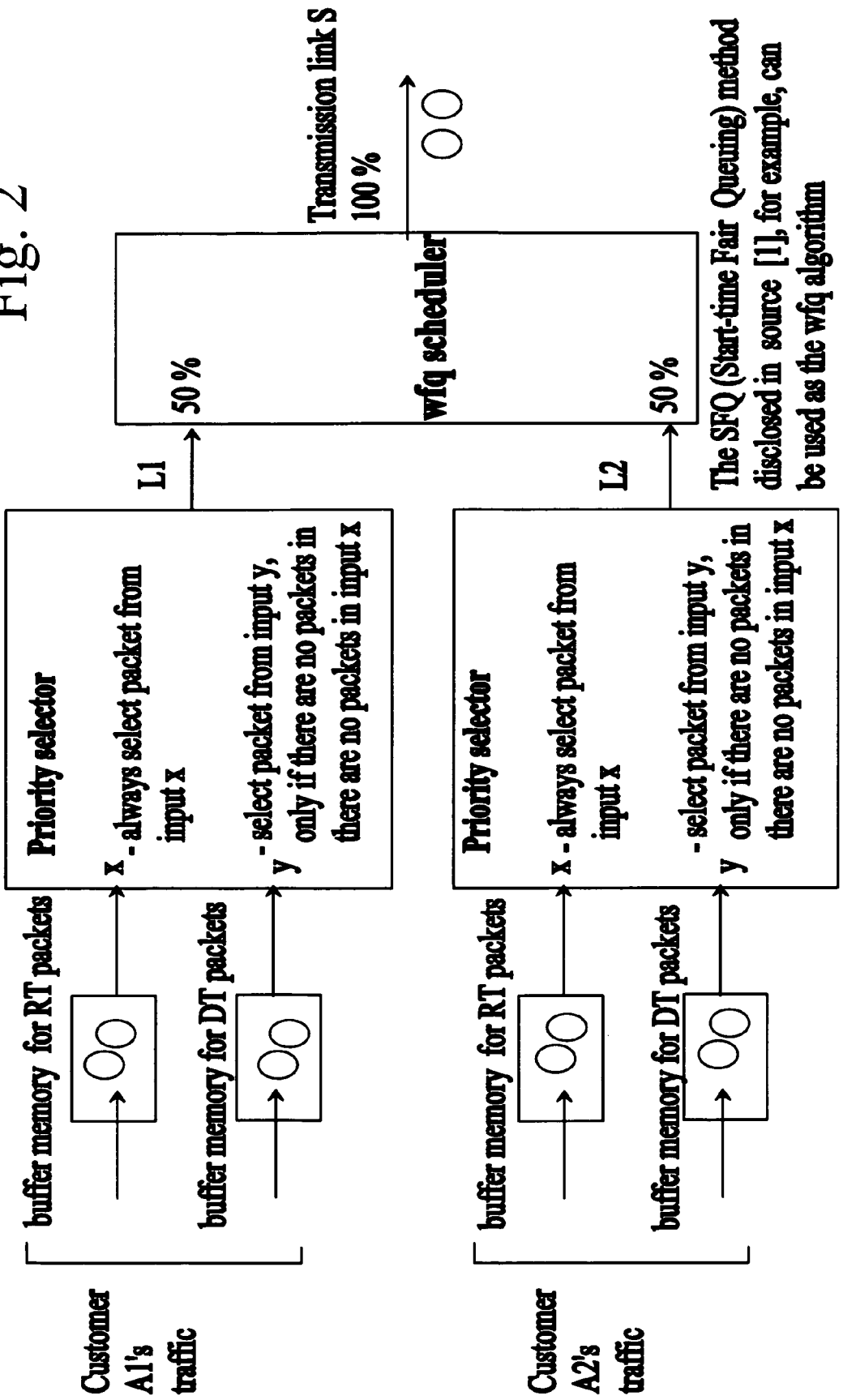
FIG. 2 shows a block diagram of one system according to the prior art for scheduling the capacity of a transmission link S for traffic flows formed of packets representing customers A1 and A2 as well as the aforementioned service-quality classes (RT and DT).
Figure 3:
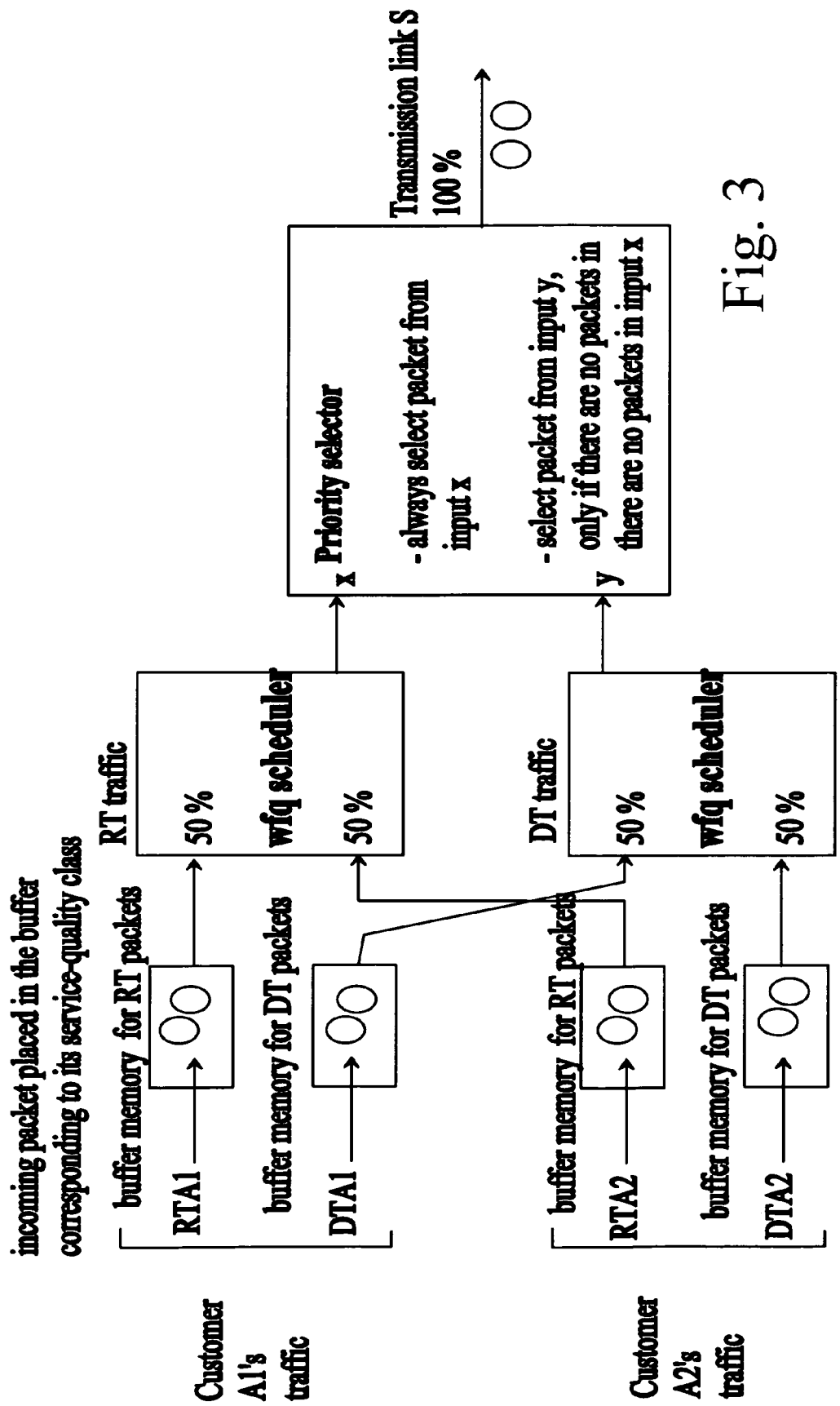
FIG. 3 shows a block diagram of a second system according to the prior art for scheduling the capacity of a transmission link S for traffic flows formed of packets representing customers A1 and A2 as well as the aforementioned service-quality classes (RT and DT).

The theoretical basis of the method according to the invention will become apparent from the following examination.

In a weighting-factor based scheduling method, a sequence indication SJ (for example, Start_tag in the SFQ method [1]) is formed for the packets in the scheduler's input, which states when the packet in question will be in turn for forwarding. The first packet to be forwarded is that which has a sequence indication with a value that states the earliest forwarding moment.

The weighting factor W, corresponding to information relating to the service-quality class represented by the packet in question and/or other information relating to the packet, is used when forming the sequence indication SJ for a packet to be scheduled. If the weighting factor $W_1$ is set for packets representing the traffic flow L1 and the weighting factor $W_2$ for packets representing the traffic flow L2, then the mutual relation between the capacity shares received by the traffic flows L1 and L2 is $W_1:W_2$.

In a priority-based scheduling method, a priority value P is attached to the packets to be scheduled. The priority values of the packets state which packet is the next to be forwarded.

The following illustrates the operation of the scheduler according to the invention, if the SFQ (Start Time Fair Queuing) algorithm [1] is used as the weighting-factor based scheduling method. A weighting factor W is attached to the packets representing a traffic flow to be scheduled (for example, L1 and L2 in FIG. 4) and expresses the relative share as to how much of the capacity of the transmission link the traffic flow in question will receive, in a situation in which all the traffic flows are active, i.e. offer packets to the transmission link for forwarding. In addition, a priority value P, which states the priority of the traffic share that the packet: in question represents, is attached to each packet. The requirement is that a packet $Pkt_k$ representing a higher priority $P_1$ is always selecting for transmission before a packet $Pkt_l$ representing a lower priority $P_2$ ($P_1>P_2$).

In the SFQ algorithm [1], the sequence indication SJ (Start tag) is calculated for a packet $Pkt_k$ representing a traffic flow i:

$$SJ_{i,k}=\max\{v, SJ_{i,k-1}+\text{packet\_size[bit]}/W_i\}, \quad (1)$$

in which $W_i$ is the weighting factor relating to the packet i and v is the smallest of the previously calculated sequence indications, which relate to the active traffic flows (virtual time). A traffic flow is active, if a packet representing it is waiting forwarding, or is presently being forwarded. The sequence indication for each packet is calculated only once; a sequence indication that has already been calculated for a packet is not changed later.

In the traditional SFQ algorithm, the packet selected is that with the smaller sequence indication $SJ_{i,k}$.

In the method according to the invention, the selection process is as follows:

Stage 1: The packets that belong to the highest active priority class are selected from the group J of packets being examined (a priority class is active, when packets representing it are in the group of packets being examined). Thus a sub-group J\Highest of packets representing the highest active priority is obtained.

Stage 2: From the sub-group J\Highest, that packet with the smallest sequence indication SJ is selected for forwarding.

When a packet $Pkt_k$, representing the traffic flow i, arrives in the group J of packets being examined, a sequence indication $SJ_{i,k}$ is calculated for the packet in question according to the equation (1), in which $SJ_{i,k-1}$ is the sequence indication relating to the packet $Pkt_{k-1}$ preceding the arriving packet in the traffic flow i. The packet arrives in the group J either when the traffic flow relating to the packet activates, or else immediately after the preceding packet in the same traffic flow has been forwarded (i.e. the preceding packet leaves the group J and the next packet representing the same traffic flow is offered in the buffer memory storing the packets).

If, for example, from the past to the moment being examined, the traffic flows i and j have received an equal amount of transmission service and the same weighting factor W(packet belongs to flow i)=W(packet belongs to flow j) has been set for packets representing the relevant flows, then the sequence indications of consecutive packets representing both traffic flows will have increased by the same angular coefficient relative to time. If the traffic flow i begins to offer packets with a higher priority than flow j, the traffic flow i will receive service but traffic flow j will not. In that case, the sequence indication relating to traffic flow i will increase in the consecutive packets, while the sequence indication relating to the traffic flow j will remain unchanged, because the packets offered by traffic flow j will not be forwarded. If the situation changes, after a specific moment in time, in such a way that the traffic flows offer packets with the same priority, the traffic flow j alone will receive the service until the sequence indicator relating to it has increased to the same level as the sequence indicator relating to the traffic flow i. In other words, if some alternating traffic flow receives an advantage for a specific period of time on the basis of priority, then when the priority advantage terminates the packets of the traffic flow that has received the advantage will be in a weaker position compared to the packets of the other traffic flow which have the same priority level.

In the situation according to FIG. 4, if the customer A1 produces RT traffic to 50% of the capacity of the transmission link S and the same amount of DT traffic while the customer A2 produces only DT traffic to 50% of the capacity of the transmission link S, then customer A1's RT traffic and customer A2's DT traffic is forwarded (total of 100% of the capacity of the transmission link). In that case, both customers will receive the 50% of the capacity of the transmission link S reserved for them. How each customer divides their capacity share between RT and DT traffic remains an internal matter for the customer concerned).

The virtual time v appearing in equation 1 is needed to prevent a packet representing a traffic flow that is becoming active from receiving an advantage in scheduling due to the fact that the traffic flow represented by the packet in question has not offered packets for forwarding during the preceding period of time. If the traffic flow is not active, the sequence indicator relating to it will not increase. Giving this sequence indication to a packet arriving after the break would give the packet in question the aforesaid unjustified advantage in scheduling. It can be seen from the equation (1), that when a traffic flow is activated, packets representing it are not put in a better position in terms of weighting-factor based scheduling that a packet that has previously arranged that is in the best position related to the weighting-factor based scheduling.

In the traditional SFQ algorithm [1], the definition of virtual time is as follows: 'v is the sequence indication of the packet that is currently to be forwarded'. If, in the method according to the invention, all the packets represent the same priority class, the definition of virtual time presented previously in this text: 'v is the smallest of the previously calculated sequence indicators that relate to active traffic flows' is consistent with the original definition, because the packet to which the smallest of these previously calculated sequence indicators relates, which relate to the active traffic flows, is at the same time the packet, which has been selected for forwarding.

Some other algorithm than the SFQ algorithm, for example, the Deficit Round Robin (DRR) [2] or the Modified Deficit Round Robin (MDRR) [3], can be used as the weighting-factor based scheduling method to be used in connection with the present invention.

REFERENCES

[1] Pawan Goyal, Harric M. Vin, Haichen Cheng. *Start-time Fair Sharing; A scheduling Algorithm for Integrated Services Packet Switching Networks*. Technical Report TR-96-02, Department of Computer Sciences, University of Texas Austin.

[2] John W. Lockwood, Lars Wischof. *Packet Scheduling for Link Sharing and Quality of Service Support in Wireless Local Area Networks*. Depart of Computer Science, Applied Research Lab, Washington University, Saint Louis, Nov. 13, 2001.

[3] Presentation of MDRR (Modified Deficit Round. Robin)/ Cisco Systems/Location: http://www.cisco.com/warp/public/63/mdrr_wred_overview.html

The invention claimed is:

1. A method for scheduling transmission-link capacity between packet switched traffic flows in a telecommunications network element when packet transmission demand from the traffic flows exceeds transmission link capacity, comprising:
   utilizing at least one of a processor and a microcircuit apparatus in the network element to perform a scheduling process by:
   receiving digital information as constant or variable-size packets offered from the traffic flows for forwarding, and collecting the packets in a buffer memory,
   attaching one of at least two alternative priority values to each of the packets,
   attaching a weighting-factor value to each of the traffic flows,
   using a weighting-factor based scheduling method for calculating a sequence indicator for each of the packets that are offered for forwarding,
   selecting one packet from packets that are offered for forwarding, and
   forwarding the selected packet to an outgoing data transmission link for transmission via the telecommunication network,
wherein once the transmission of the selected packed has terminated, a next packet to be forwarded is selected, and wherein the selection of the packet to be forwarded is performed in two stages, as follows:
   1) a sub-group of packets is extracted from the packets offered for forwarding, the extracted sub-group containing the packets representing the highest priority value to be found from the packets offered for forwarding, and
   2) the packet to be forwarded is selected from the extracted sub-group of packets on the basis of the sequence indicators related to the packets belonging to the extracted sub-group of packets.

2. The method according to claim 1, wherein the SFQ (Start-time Fair Queuing) method is used as the weighting-factor based scheduling method.

3. The method according to claim 1, wherein the DDR (Deficit Round Robin) method is used as the weighting-factor based scheduling method.

4. The method according to claim 1, wherein the MDRR (Modified Deficit Round Robin) method is used as the weighting-factor based scheduling method.

5. An apparatus for scheduling transmission-link capacity between packet switched traffic flows in a telecommunications network element when packet transmission demand from the traffic flows exceeds transmission link capacity, in which the apparatus comprises:
   means for receiving constant or variable-size packets containing digital information offered by the traffic flows for forwarding,
   a buffer memory for collecting the received packets,
   means for attaching one of at least two alternative priority values to each of the packets,
   means for attaching a weighting-factor value to each of the traffic flows,
   means for using a weighting-factor based scheduling method for calculating a sequence indicator for each of the packets that are offered for forwarding,
   means for selecting one packet from the packets that are offered for forwarding,
   means for forwarding the selected packet to an outgoing data transmission link for transmission via the telecommunication network,
wherein the means for selecting is configured to perform the packet selection in two stages as follows:
   1) a sub-group of packets is extracted from the packets offered for forwarding, the extracted sub-group containing the packets representing the highest priority value to be found from the packets offered for forwarding, and
   2) the packet to be forwarded is selected from the extracted sub-group of packets on the basis of the sequence indicators related to the packets belonging to the extracted sub-group of packets.

6. The apparatus according to claim 5, wherein the weighting-factor based scheduling method is the SFQ (Start-time Fair Queuing) method.

7. The apparatus according to claim 5, wherein the weighting-factor based scheduling method is the DRR (Deficit Round Robin) method.

8. The apparatus according to claim 5, wherein the weighting-factor based scheduling method is the MDRR (Modified Deficit Round Robin) method.

* * * * *